United States Patent [19]
Lindenmaier et al.

[11] 3,968,625
[45] July 13, 1976

[54] APPARATUS FOR THE TREATMENT OF REFUSE OR THE LIKE WITH A FOAM MATERIAL

[76] Inventors: Walter E. G. Lindenmaier, Beethovenweg 47, 7958 Laupheim; Hans Sukopp, 7959 Orsenhausen, Germany

[22] Filed: Mar. 10, 1975

[21] Appl. No.: 557,072

Related U.S. Application Data
[62] Division of Ser. No. 470,278, May 15, 1974.

[30] Foreign Application Priority Data

| | | |
|---|---|---|
| Aug. 6, 1973 | Germany | 2339777 |
| Oct. 15, 1973 | Germany | 2351679 |
| Nov. 20, 1973 | Germany | B41464[U] |

[52] U.S. Cl. .................. 53/124 D; 100/73; 100/100; 100/153; 100/218
[51] Int. Cl.² .................................. B65B 1/24
[58] Field of Search ............... 53/124 B, 124 D; 100/255, 240, 73, 218, 100, 153, 73

[56] References Cited
UNITED STATES PATENTS

| | | | |
|---|---|---|---|
| 787,501 | 4/1905 | Donald | 100/255 |
| 1,296,830 | 3/1919 | Marsh | 100/255 X |
| 3,563,168 | 2/1971 | Doninger | 53/124 B |
| 3,729,107 | 4/1973 | Present | 53/124 B |

*Primary Examiner*—Leon Gilden
*Attorney, Agent, or Firm*—Haseltine, Lake & Waters

[57] ABSTRACT

A method and apparatus for the foam-encasing of refuse, through the intermediary of which refuse being dumped may, in a simple and satisfactory enclosed manner with respect to the surroundings, be transported, stored and further processed. In the method the refuse or the like is compacted and foam-encased by an all-encompassing closed-cellular foam material layer so as to form a predetermined completely defined three-dimensional body. The apparatus for carrying out the method is constructed, in one embodiment, so as to consist of a closed form constituted of a plurality of form elements, which are adapted to be separated from each other, for the compacting and foam-encasing of the refuse or the like, and in whose walls there are distributed a plurality of nozzles for the infeed of the foam materials into the form. The apparatus for carrying out the method may also be constructed whereby at least two conically converging conveyor bands are provided for the compacting of the refuse or the like, and including a successive channel with a separating arrangement for the refuse in the inlet region, a nozzle system for the foaming sequence in the intermediate region and a separating or cutting arrangement for the foam material in the end region thereof. In another embodiment, there is provided a barrel-like container particularly adapted for transporting and storing poisonous or toxic refuse, which is encompassed by a thin layer of plastic material which, in turn, is coated by the closed-cellular foam material.

1 Claim, 11 Drawing Figures

APPARATUS FOR THE TREATMENT OF REFUSE OR THE LIKE WITH A FOAM MATERIAL

This application is a divisional application of copending Ser. No. 470,287; filed May 15, 1974.

FIELD OF THE INVENTION

The present invention relates to a method of foam-encasing refuse, specialized refuse, toxic refuse or the like with a foam material having a closed-cellular structure and to an apparatus for the carrying out of such a method.

The designation closed-cellular structure signifies that the foam material which is employed is constructed so as to, after hardening thereof, seal itself with respect to water and the like. Suitable foam materials are foam materials constructed on a rubber base and foam plastic materials, meaning in essence, synthetic foam materials and mixtures of both. Foam plastic materials which are suitable, for example, are single or copolymer polyvinyl chloride, polyurethane, polystryol, and phenolic resin foam, as well as phenol-formaldehyde resins. Furthermore, also adapted to be utilized are polyethylene, polypropylene, polyether, silicon, polyester, epoxy resins, viscose, or other soluble cellulose or their derivatives in mixture with the above-mentioned materials and the like.

DISCUSSION OF THE PRIOR ART

Presently known methods for the transportation and storage of refuse and the like suffer from the disadvantage that a satisfactory enclosure of the refuse during transport and during storage thereof is not provided with any assurance. A known method for the foam encasing with foam material of refuse which has been deposited in a refuse dump to a large extent solves the problem of the ultimate storage of the refuse, but does not, however, mention the transportation problem, as well as the problem of any interim storage and the simple further conveyance, or respectively, continued processing of the refuse.

Accordingly, it is an object of the invention to provide a method and apparatus for the foam-encasing of refuse, and through the intermediary of which refuse being dumped may, in a simple and satisfactory enclosed manner with respect to the surroundings be transported, stored and further processed.

The foregoing object is inventively solved through a method of the above-described type, in that the refuse or the like is sealed or foam-encased by an all-encompassing closed foam material layer so as to form a predetermined completely limited three-dimensional body.

It is a further object of the present invention to provide a method for the foam-encasing of refuse, through the intermediary of which deposited specialized refuse and, in particular, poisonous or toxic refuse, may be readily and satisfactorily enclosed for transportation, storage and further processing thereof.

The above object is inventively solved by the present method in that the specialized refuse and, in particular, toxic or poisonous refuse, after introduction thereof into suitable containers or receptacle, is foam encased by an all-encompassing foam material layer.

The encased bodies formed pursuant to the present invention not only facilitate the short term storing of refuse, but also the conservating storage of refuse over lengthy time spans, so as to permit the refuse to be further processed at a later date, for example, for the extraction of crude oil or other basic materials.

Still another object of the present invention lies in providing a barrel-like closed container, particularly adapted for transporting and storing poisonous or toxic refuse and the like, which is encompassed by a thin layer of plastic material which, in turn, is coated by a layer of closed-cellular foam material.

A practical further development of this method lies in that the refuse or the like may be compacted in the form of a continuous strand, segmented into sections from the continuous strand, and then foam-encased. This further development of the method becomes particularly advantageous when large quantities of refuse masses are deposited at any one location, and are to be foam-encased for transportation or further processing.

Another advantageous embodiment of the method lies in that the refuse or the like may be compacted in pre-foamed open containers which are formed of a closed-cellular structured foam material, which by additional further foaming of the container opening, is then foam-encased on all sides thereof. This method of foam-encompassing refuse is then particularly suitable when the refuse is immediately after its depositing filled into the pre-foamed open container, and in which the open container after filling thereof is only at a later time interval taken up for compacting and additional foaming. A suitable field of application for this method may be in the removal of household refuse.

When concerned with deposit or dumping places for refuse over widely distributed locations each having only relatively small quantities of deposited refuse, it may be advantageous that the refuse or the like be conveyed into a vehicle, therein compacted and foam encased, and then removed from the vehicle, therein compacted and foam encased, and then removed from the vehicle. In that instance, the refuse may be received at the dumping location, foam-encased on all sides thereof during transportation towards a storage or other processing location, and finally removed from the vehicle in the shape of a block formed by the foam-encasing of the refuse.

Finally, the refuse or the like in the shape of predetermined construction blocks may be sealed and foam-encased for further utilization thereof. As construction elements of that type there may be considered, for example, plate elements, step elements, roadway elements, channel elements, or mutually coordinated and dimensioned individual elements for the covering of larger surfaces.

An apparatus for carrying out the required tasks is inventively constructed so as to consist of a closed form constituted of a plurality of form elements, which are adapted to be separated from each other, for the compacting and foam-encasing of the refuse or the like, and in whose walls there are distributed a plurality of nozzles for the infeed of the foam materials into the form.

The form components may be made extensible or separable so as to enable the ready removal of the foam-encased bodies from the foaming apparatus after completion of the foam-encasing operation. When utilizing pre-foamed open containers of a foam material, the apparatus is suitably so constructed that only the opening of a pre-foamed open container of a comparably formed component is provided with nozzles.

The apparatus for the sealing and foam-encasing of refuse and the like may also be so constructed so as to consist of a form open on one side thereof, having side walls diverging toward the opening, and having therein distributed nozzles for the infeed of the foam material, as well as a removable cover portion which similarly may include nozzles.

The form including the associated containers for the foam material may be situated on a vehicle, which leads to the application and advantages mentioned in connection with the respective method.

Finally, the apparatus for carrying out the inventive method may be constructed whereby at least two conically converging conveyor bands are provided for the compacting of the refuse or the like, and including a successive channel with a separating arrangement for the refuse in the inlet region, a nozzle system for the foaming sequence in the intermediate region and a separating or cutting arrangement for the foam material in the end region thereof.

It is to be understood that an apparatus of this type need not necessarily be stationary, but may be located on a suitable vehicle if there is a need therefore.

BRIEF DESCRIPTION OF THE DRAWINGS

Exemplary embodiments of the inventive apparatus, as well as of the elements or bodies formed by the invention, may be ascertained from the following detailed description of the inventive method and apparatus, having reference to the accompanying drawings, in which:

FIG. 10 is a schematic view of a continuously operating apparatus for the compacting and foam-encasing of refuse and the like; and FIG. 11 is an elevational perspective view of a receptacle adapted to transport and store poisonous or toxic refuse and the like.

DETAILED DESCRIPTION

Figure 1:
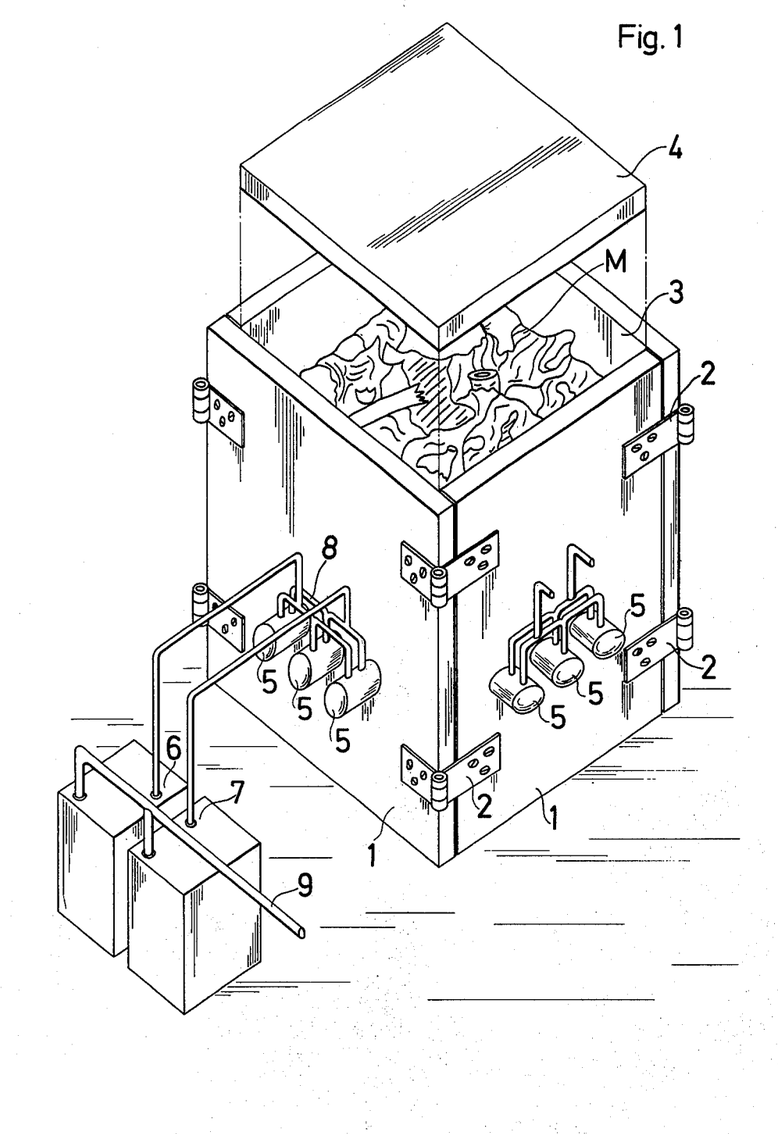
FIG. 1 illustrates, in a perspective schematic representation, a form for the compacting and foam-encasing of refuse after filling thereof with refuse.

FIG. 1 shows, in a schemtic perspective representation, a form for the compacting and foam-encasing of refuse M after the filling thereof into the form. The form consists of form components 1 connected by means of detachable connecting members 2, and of a cover 4 which is dimensioned so as to precisely fit into the refuse infeed opening 3 of the form. In the walls of the form elements and if required also in the cover 4, there are provided nozzles 5 which respectively receive from tanks 6 and 7 through an associated conduit system 8, two components for the production of a foam material of closed-cellular structure. The introduction of foam material into the interior of the form may be attained in precisely dosed quantities by means of an air pressure conduit 9 which is connected to both tanks 6 and 7.

The refuse M which is to be foam-encased is, as required, filled into the form with the admixing of spoilage retardant or enhancing substances dependent upon the intended further processing, and in which the form components 1 are rigidly interconnected with each other by means of the connecting members 2. The refuse may also have other materials admixed therewith which facilitate decomposition in closed spaces, or materials may be added thereto which afford or support decomposition along a predetermined direction for the further processing of the refuse or the other loosely poured filling materials.

Figure 2:
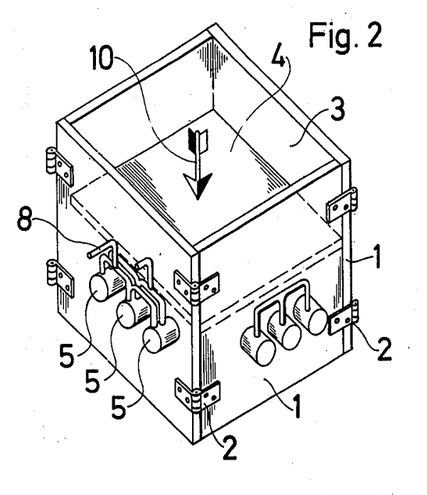
FIG. 2 is a schematic perspective view of the form of FIG. 1 during the sequence of compacting and foam-encasing of the refuse.

After the form has been filled, the cover 4 is positioned thereon, and pressed downwardly in the direction of arrow 10, as shown in FIG. 2, so as to compact the refuse. Subsequent thereto, there is effected the foam-encasing of the refuse through the intermediary of the nozzles 5. It is to be understood that pursuant to the pressure of the foam-encasing sequence there also occurs during the foam-encasing a further compacting of the refuse, inasmuch as the foam material does not merely remain on the upper surface of the body which is constituted primary of, refuse, but also extends into the body itself.

Figure 3:
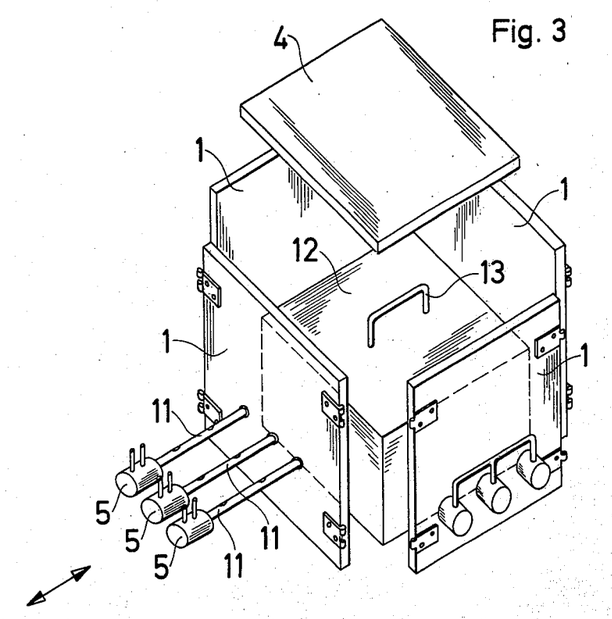
FIG. 3 is a schematic perspective view of the form of FIG. 1 in the opened condition thereof subsequent to the compacting and foam-encasing sequence.

In order to enhance such an infusion of the foam material into the interior of the body, tubular probes 11 which have suitable spaced apertures, may be provided on the nozzles 5, as schematically illustrated in FIG. 3 in the extended positions thereof.

After the refuse has been compacted and foam-encased, the cover 4 is removed and the form components 1, after opening of the connecting elements 2, are pulled apart as shown in FIG. 3. A so formed foam-encased body 12 may then, for example, be removed from the form with the assistance of one or more foamed-in ears 13.

It is to be noted that the refuse contained within the body 12 is encased with an all sides encompassing, sealed foam material layer. In a similar manner, for example, there may be foam-encased cadavers for storage or further processing, without creating the danger that toxic poisons be freed from the cadavers.

Figure 4:
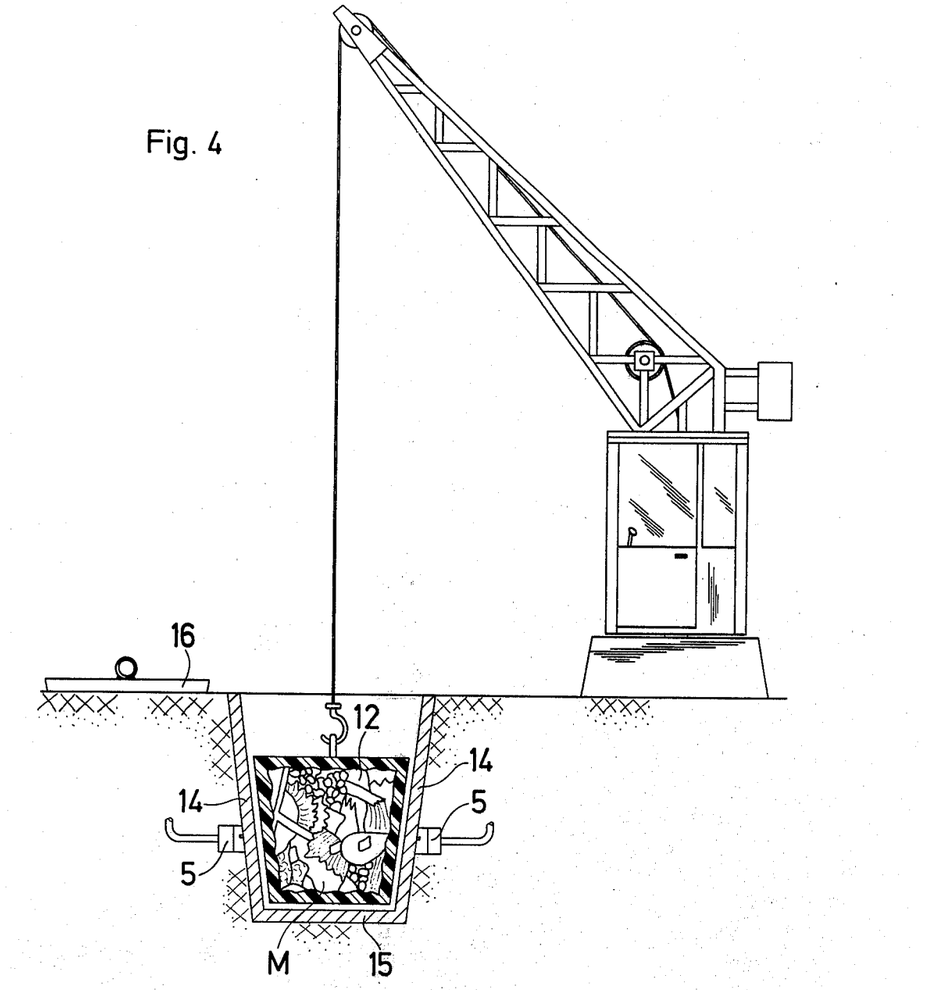
FIG. 4 is a schematic view of a form having fixed side walls subsequent to the sequence of compacting and foam-encasing.

FIG. 4 illustrates a further embodiment of an apparatus for the compacting and foam encasing of refuse and the like. In the disclosed embodiments a form has side walls 14 which diverge conically upwardly and a bottom 15 which is located below ground. In order to effect the compacting of the refuse which is conveyed into the form, and preparing for the foam-encasing, a cover 16 is positioned thereon and pressed into the form. The side walls 14 of the form, as well as, respectively, the bottom 15 and also the cover 16 are again provided with nozzles 5 for the introduction of the foam material into the form, as in the previously-described embodiment.

In the embodiment of the appratus illustrated in FIG. 4 for the compacting and foam-encasing of refuse, the side walls 14 of the form need not be detachable from each other, since the removal of the foam-encased body 12 from the form is facilitated by the divergent walls 14 which conically widen towards the opening of the form.

The finished foam-encased body 12 may, in the example of FIG. 4, be removed from the form by means of a crane 17 and loaded onto a suitable transport means. If the foamed refuse is constructed so that the foam-encased body is floatable, the latter may be also without any kind of transport means, floated in a canal or the like for further conveyance thereof.

Figure 5:
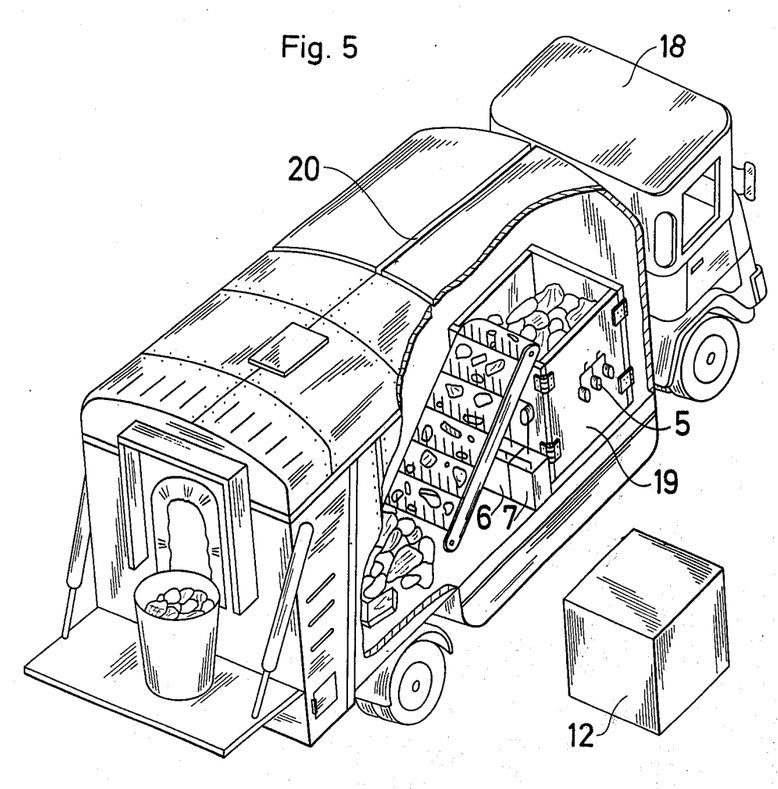
FIG. 5 is a schematic perspective representation of an apparatus according to the invention as mounted on a vehicle.

FIG. 5 schematically shows a foaming apparatus 19 which is located on a vehicle 18. The apparatus 19 may, for example, be constructed so that its form portions, after the completion of the compacting and foam-encasing sequence, together with the structure of the vehicle 18, may be disassembled or taken apart, so as to allow for the removal of the foam-encased body with the aid of a crane from the vehicle structure which is opened along a dividing line 20. It is also possible to utilize a form having conically extensible walls, and to have only the vehicle structure separable for removal, or to remove the foam-encased body from the vehicle in another manner.

Figure 6:
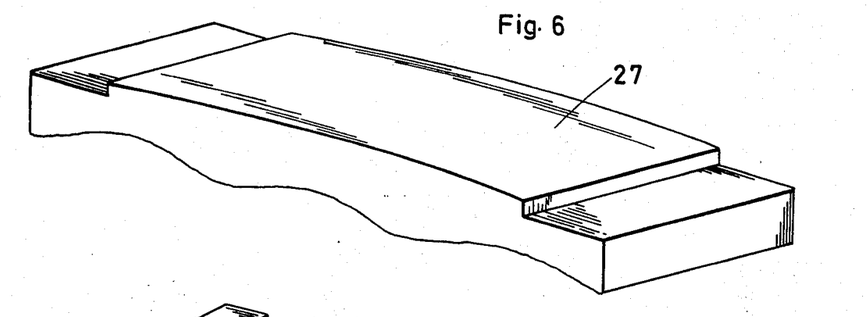
FIGS. 6 through 9 are examples of elements or bodies formed in accordance with the invention.

FIGS. 6 through 9 illustrate the various forms of building or construction elements into which the body may be formed. Thus, for example, FIG. 6 shows a roadway element 21 which is filled with a compacted refuse and then foam-encased with foam material. Roadway elements 21 of that type may, for example, be assembled for roadway base structures and as desired, fused to each other so as to apply the refuse to a practical use.

Figure 7:
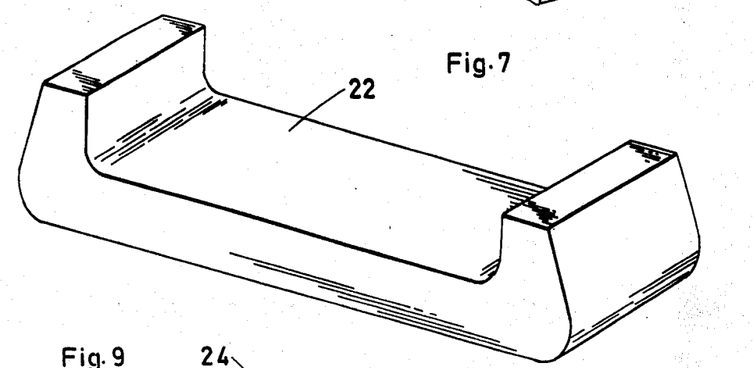

In a similar manner, as shown in FIG. 7, a formed channel element 22 may be utilized for the sealing and strengthening of channels.

Figure 8:
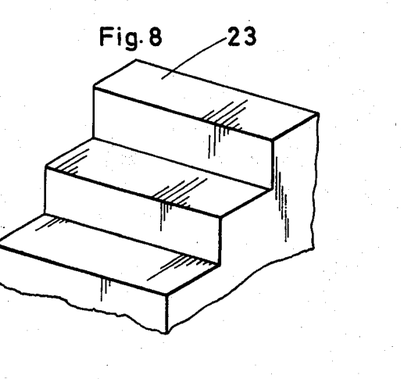

FIG. 8 shows a step element 23 which may be utilized in building construction, or in garden terracing. In this connection, it is to be noted that the foam material, during the foaming of the refuse, may have coloring components added thereto so as to impart a desired coloring to the foam-encased body, or, respectively, the herein described building elements.

Figure 9:
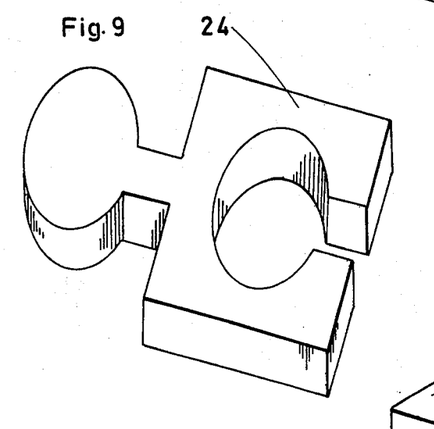

FIG. 9 illustrates a single element 24 which is particularly suitable for the covering or surfacing of large areas through the self-locking or interengaging assembly of numerous of these individual elements 24.

The foam-encased refuse body may in general be provided in the form of plates, spheres, or mutually connectable form elements having suitable connecting portions and/or corresponding suspension arrangements for transporting thereof. The connection of the bodies with each other may, for example, be attained with the aid of dovetail connections formed on the body. The bodies, in plate or block form, as well as in any of the other above-described shapes are also utilizable in filling in ground formations (land reclamation); and thereby serve a second purpose besides the removal of the refuse.

In any event, the refuse may, through the compaction and foaming thereof into encased bodies, be easily transported and further processed. Any odors caused by the refuse are removed at the instance in which the foam-encased body is formed from the foam-treated refuse.

Figure 10:
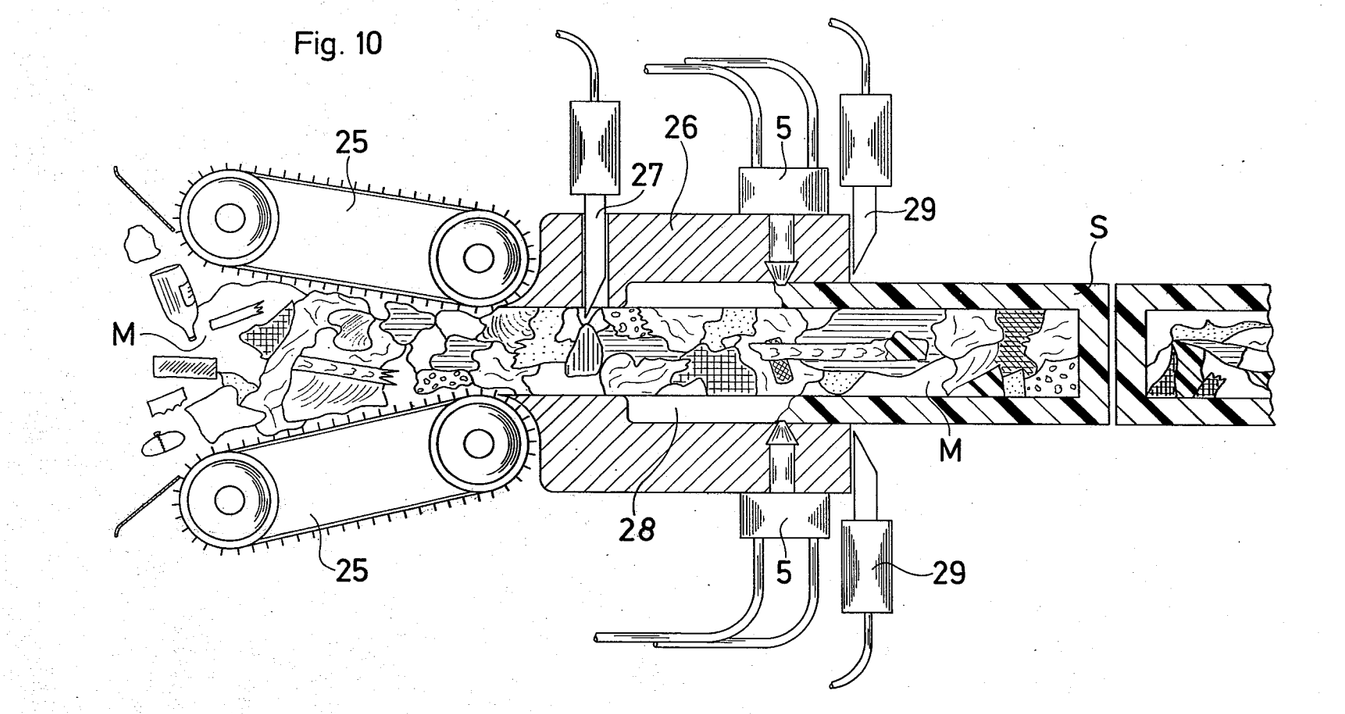

FIG. 10 shows a further exemplary embodiment of an apparatus for the compacting and foam-encasing of refuse. This apparatus contains two conically converging conveyor bands 23, between which there is introduced the refuse M which is to be compacted and foam-encased. The conveyor bands 25 compact the refuse and press it into a channel 26 at whose inlet end there is provided a separating installation 27 comprising, for example, a knife which is displaceable transverse to the longitudinal axis of the channel so as to be able to divide the continuously formed compacted refuse bar into segments of predetermined lengths. Following in the intermediate zone 28 of the channel 26, having an enlarged cross-section, there is provided a nozzle system with nozzles 5 extending about the channel for introducing the foam material interiorly of the channel and for the foam treatment of the compacted refuse. Finally, at the outlet end of the channel 26 there is provided a separating arrangement 29, through the aid of which the foam material S encasing the refuse is cut through so as to form individual foam-encompassed bodies.

The channel 26 is constructed so that at a predetermined pressure of the foam material emanating from the nozzles 5, the foam material does not only encompass the refuse bar, but also enters into the pores of the bar of refuse.

The separating arrangement 29 at the outlet end of the channel 26 may consist of an electrically heated and driven cutting installation. The installation divides the foam treated and encased bodies into segments whose peripheral dimensions at the separating surface are determined by the shape of the channel opening.

The continuously operating apparatus for the compacting and foam-encasing of refuse schematically illustrated in FIG. 10, is particularly adapted to be used in conjunction with other installations such as, for example, sorting installations, crushing installations, or combustion installations. In this instance, the apparatus is generally constructed so as to be stationary. It is also possible that the apparatus shown in FIG. 10 be located on a transport means and to be utilized at such locations in which there is a need for that type of apparatus.

Figure 11:
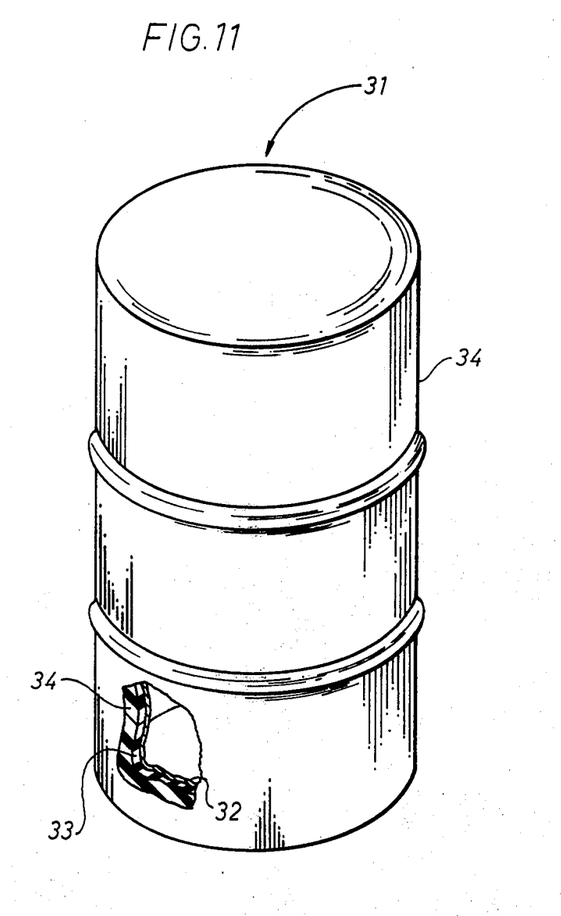

Referring now to FIG. 11 of the drawings, there is disclosed a receptacle, preferably of barrel-shaped configurtion, in which, for example, there may be located poisonous or toxic refuse, and whose inner surface is resistant to the poisonous refuse. Due to the inventive construction of the receptacle with the enclosed poisonous refuse, there is achieved a satisfactory protection against corrosion of the outer surface of the receptacle.

The receptacle 31, which has the form of a barrel, has an inner wall structure 32, suitably formed of metal. The wall structure 32 is covered by a coating of thin plastic material layer 33, which assures a satisfactory external corrosion protection for the receptacle. Preferably, the plastic material comprises single component based polyurethane. An additional foam material layer 34 is superimposed on the plastic material layer 33 which enhances the protection against corrosion of the receptacle, and particularly provides for the mechanical protection of the receptacle by significantly increasing the stability thereof. Furthermore, the additional foam material also protects the receptacle from undue external mechanical forces which would tend to damage the receptacle.

The thin layer of unfoamed plastic material 33 closes off the poisonous refuse within the previously closed receptacle 31 with respect to the environment already prior to the application of the foamed material thereon. This allows a broader range of selection of materials which may be employed for the closed-cellular foamed material. The plastic material layer or coating 33 may have thickness of, for example, about 0.5 mm.

Through the use of the inventive receptacle, the transportation, storage and, if required, further processing of the specialized refuse, particularly poisonous or toxic refuse, may be readily and absolutely safely regulated with respect to the surrounding environment.

The thin plastic material layer encompassing the receptacle is suitably formed on the basis of polyurethane, and the foamed material layer is similarly made of polyurethane. This will permit for the simple control of particularly specialized refuse in the form of cyanides. The utilized foam material preferably has a specific weight in the range of between 40 and 1000 kg/m$^3$.

In the selection of materials to be employed for the thin plastic material layer and for the foamed material, it must be considered that such a foamed material is to be chosen which will not be attacked by the specialized refuse which is to be encompassed, such as for example, arsenic-containing refuse or electrolytic residues like cyanide including acidic components.

Preferably, the thin plastic material layer fully encloses the receptacle on all sides thereof.

The containers in which, for example, there are filled poisonous or toxic refuse, are generally fibrous whose inner surfaces are resistant to the toxic refuse. By means the inventive foam treating of the containers subsequent to the filling thereof with the toxic refuse, there is obtained a satisfactory degree of protection against corrosion at the outer surfaces of the containers. Furthermore, the applied foam material layer has the advantage in that the mechanical stability of the containers is extensively improved, and provides damping against mechanical forces acting from externally on the containers.

Through the inventive process the conveyance, storage and, if required, further processing of the specialized refuse, particularly toxic or poisonous refuse, is satisfactory and absolutely assuredly controlled with respect to general environmental requirements.

Preferably, the foam material layer encompassing the container having the toxic refuse therein is formed of polyurethane. This renders it possible, for example, to satisfactorily bring under control specialized deposits in the form of cyanides. The utilized foam material preferably has a specific weight of between 40 and 1000 kg/m$^3$.

In the selection of the material for the foam material layer it must be considered that such a foam material is to be selected which is impervious to the to be foam treated specialized refuse such as, for example, arson-containing deposits or electrolysis residuals such as cyanide with acid components.

In the deposition of specialized refuse in relatively small quantities at widely dispersed locations, it may be advantageous that the specialized refuse or the like is collected first in a container, then conveyed into a vehicle, foam-treated therein, and then removed from the vehicle. This renders it possible to pick up the specialized refuse in its deposition or dumping location, and during conveyance thereof toward a storage location to foam-encase the latter with respect to the environment.

Finally, the specialized refuse or the like may be foam-encased in the form of predetermined mutually shaped constructional elements for further utilization thereof.

In addition to the foregoing concept, it is also noted that, for example, possibly in lieu of specialized refuse, quantities of grain, wheat, corn or the like may be foam-encased in accordance with the inventive process. In this instance, the container into which the grain is filled is preferably formed of a pre-foamed closed-cellular structured foam material. After the infeed of the grain into the container, the container opening is then foam sealed. The grain is thereby adapted to be readily conveyed, storaged, and finally further processed.

While there has been shown what is considered to be the preferred embodiment of the invention, it will be obvious that modifications may be made which come within the scope of the disclosure of the specification.

What is claimed is:

1. An apparatus for the foam-treating of refuse or the like with a foam material of closed-cellular structure, comprising enclosure means for receiving a quantity of said refuse; means for compacting said refuse; said refuse compacting means comprising two conically converging movable conveyor bands receiving said refuse between the adjacent runs of said bands, said conveyor bands forming a continuous strand of said compacted refuse, said enclosure means including an elongate channel having an inlet end for receiving said compacted refuse strand; means adjacent said inlet end for separating said strand into compacted refuse segments of predetermined lengths; means for imparting a layer of said foam material to said compacted refuse, said last-mentioned means including foam material inlet nozzle means communicating with the interior of said channel intermediate the ends thereof for imparting an encompassing layer of foam material to each of said compacted refuse segments; and cutting means adjacent the outlet end of said channel for separating the foam material-enclosed segments between adjacent segments so as to form successive foam material-encased bodies.

* * * * *

UNITED STATES PATENT OFFICE
CERTIFICATE OF CORRECTION

Patent No. 3,968,625   Dated July 13, 1976

Inventor(s) Walter E. G. Lindenmaier et al.

It is certified that error appears in the above-identified patent and that said Letters Patent are hereby corrected as shown below:

On the Title Page, Item 30 should read:

-- [30] Foreign Application Priority Data:

| | | |
|---|---|---|
| Aug. 6, 1973 | Germany | 23 39 802 |
| Oct. 15, 1973 | Germany | 23 51 679 |
| Nov. 20, 1973 | Germany | 73 41 464 --. |

Signed and Sealed this

Twenty-fifth Day of October 1977

[SEAL]

Attest:

RUTH C. MASON
*Attesting Officer*

LUTRELLE F. PARKER
*Acting Commissioner of Patents and Trademarks*